United States Patent
Rothacher et al.

(10) Patent No.: US 9,129,509 B2
(45) Date of Patent: *Sep. 8, 2015

(54) MOVABLE OBJECT PROXIMITY WARNING SYSTEM

(71) Applicant: SAFEMINE AG, Baar (CH)

(72) Inventors: Urs Martin Rothacher, Thalwil (CH); Peter Arnold Stegmaier, Ponte Capriasca (CH)

(73) Assignee: SAFEMINE AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,870

(22) Filed: Jun. 3, 2014

(65) Prior Publication Data

US 2014/0285350 A1    Sep. 25, 2014

Related U.S. Application Data

(63) Continuation of application No. 13/377,761, filed as application No. PCT/CH2009/000200 on Jun. 12, 2009, now Pat. No. 8,779,934.

(51) Int. Cl.
| | |
|---|---|
| *G08B 21/00* | (2006.01) |
| *G08B 21/18* | (2006.01) |
| *G01S 5/00* | (2006.01) |
| *G08G 1/16* | (2006.01) |
| *G08G 1/00* | (2006.01) |
| *G08G 9/02* | (2006.01) |

(52) U.S. Cl.
CPC ............... *G08B 21/18* (2013.01); *G01S 5/0072* (2013.01); *G08G 1/161* (2013.01); *G08G 1/20* (2013.01); *G08G 9/02* (2013.01)

(58) Field of Classification Search
CPC ............ G08G 1/161; G08G 1/20; G08G 9/20
USPC .............. 340/539.1, 539.11, 506, 539.13, 3.1
See application file for complete search history.

(56) References Cited

U.S. PATENT DOCUMENTS

| | | | |
|---|---|---|---|
| 4,893,356 | A | 1/1990 | Waters |
| 5,068,654 | A | 11/1991 | Husher |
| 5,983,161 | A | 11/1999 | Lemelson et al. |
| 6,031,455 | A | 2/2000 | Grube et al. |

(Continued)

FOREIGN PATENT DOCUMENTS

| | | |
|---|---|---|
| CN | 101151176 A | 3/2008 |
| CN | 101223048 A | 7/2008 |

(Continued)

OTHER PUBLICATIONS

Second Office Action in Chinese Patent Application No. 200980160496.6 dated Jul. 7, 2014.

(Continued)

*Primary Examiner* — Daryl Pope
(74) *Attorney, Agent, or Firm* — Marshall, Gerstein & Borun LLP

(57) ABSTRACT

Vehicles and other objects in a surface mine are equipped with monitoring devices that communicate by radio in order to detect the risk of collisions. The devices are equipped with GNSS-receivers. At least one of the objects has two devices mounted to it. Each of the two devices determines its position independently, which in turn allows determining not only the position, but also the orientation, of the object.

20 Claims, 2 Drawing Sheets

(56) References Cited

U.S. PATENT DOCUMENTS

| | | |
|---|---|---|
| 6,608,559 B1 | 8/2003 | Lemelson et al. |
| 6,611,755 B1 | 8/2003 | Coffee et al. |
| 6,700,493 B1 | 3/2004 | Robinson |
| 8,779,934 B2 * | 7/2014 | Rothacher et al. ......... 340/686.6 |
| 2002/0022927 A1 | 2/2002 | Lemelson et al. |
| 2004/0039526 A1 | 2/2004 | Inbar et al. |
| 2004/0113774 A1 | 6/2004 | Wilson |
| 2004/0217851 A1 | 11/2004 | Reinhart |
| 2004/0217869 A1 | 11/2004 | Bouchard et al. |
| 2006/0046648 A1 | 3/2006 | DiFonzo et al. |
| 2006/0244573 A1 | 11/2006 | Wendler |
| 2006/0273967 A1 | 12/2006 | Gat et al. |
| 2007/0008091 A1 | 1/2007 | Takenaga et al. |
| 2007/0013497 A1 | 1/2007 | Watanabe |
| 2007/0204804 A1 | 9/2007 | Swanson et al. |
| 2008/0055154 A1 | 3/2008 | Martucci et al. |
| 2009/0132112 A1 | 5/2009 | Ewerhart et al. |
| 2009/0237293 A1 | 9/2009 | Sakuma |
| 2009/0259400 A1 | 10/2009 | Coats et al. |
| 2010/0134263 A1 | 6/2010 | Mathony et al. |
| 2010/0220189 A1 | 9/2010 | Yanagi |

FOREIGN PATENT DOCUMENTS

| | | |
|---|---|---|
| DE | 19715458 | 10/1998 |
| DE | 19715458 A1 | 10/1998 |
| DE | 10260167 A1 | 7/2004 |
| DE | 102008017129 A1 | 10/2009 |
| FR | 2886440 A1 | 12/2006 |
| GB | 2452829 A | 3/2009 |
| JP | 11220726 A | 8/1999 |
| JP | 2005029338 | 2/2005 |
| JP | 2005029338 A | 2/2005 |
| JP | 2007285485 A | 11/2007 |
| WO | WO-00/79502 A1 | 12/2000 |
| WO | WO-03/001474 A2 | 1/2003 |
| WO | WO-2004/021546 A2 | 3/2004 |
| WO | WO-2004/047047 | 6/2004 |
| WO | WO-2004/047047 A1 | 6/2004 |
| WO | WO-2006/079165 A1 | 8/2006 |
| WO | WO-2007/000686 A2 | 1/2007 |
| WO | WO-2011/069266 A1 | 6/2011 |
| WO | WO-2011/069267 A1 | 6/2011 |
| WO | WO-2011/130861 A1 | 10/2011 |
| WO | WO-2011/153646 A1 | 12/2011 |
| WO | WO-2011/153652 A2 | 12/2011 |

OTHER PUBLICATIONS

International Preliminary Report on Patentability for PCT/CH2009/000200, issued Dec. 12, 2011.

International Search Report in corresponding PCT/CH2009/000200 mailed Jun. 24, 2010.

Notification of Transmittal of the International Search Report and the Written Opinion for PCT/CH2009/000200, dated Jun. 24, 2010.

* cited by examiner

MOVABLE OBJECT PROXIMITY WARNING SYSTEM

RELATED APPLICATIONS

This patent application is a continuation of and claims priority to U.S. patent application Ser. No. 13/377,761 entitled "Movable Object Proximity Warning System" and filed on Feb. 23, 2012, which is a U.S. National Stage of PCT/CH2009/000200 entitled "Movable Object Proximity Warning System" and filed Jun. 12, 2009, the entire disclosures of which are hereby expressly incorporated herein.

TECHNICAL FIELD

The invention relates to a movable object with proximity warning equipment as well as to a method for issuing proximity warnings in a system comprising at least one movable object.

BACKGROUND ART

Surface mines and similar sites or areas are generally operated by means of a large number of vehicles, some of which may be exceedingly large and difficult to control and have very limited visibility for the operator.

It has been proposed to use GNSS-devices (GNSS=global navigation satellite system, such as GPS) on board of the vehicles and other objects, such as cranes, to generate proximity warnings in order to reduce the risk of collisions between vehicles. Such a system is e.g. described in WO 2004/047047. The system is based on devices mounted to the objects. Each device comprises a GNSS receiver, a control unit deriving positional data using the signal of the GNSS receiver, a radio circuit for wireless exchange of the positional data with the other devices, and an output device for outputting proximity warnings.

Depending on the types of vehicles, such systems can become very complex or inaccurate. This is, in particular, true for highly asymmetric, large vehicles whose orientation in space may change. I.e. for rotating and/or track type vehicles, a proximity warning system needs to take the orientation of the vehicle into account, as deriving the vehicle's orientation through translatory motion is not possible or not sufficiently accurate or fast.

DISCLOSURE OF THE INVENTION

Hence, the problem to be solved by the invention is to provide an object and a method of this type that are reasonably safe also for large, movable objects.

This problem is solved by the object and method according to the independent claims.

Accordingly, a first and at least one second monitoring device are arranged on the same object at a distance from each other:

The first device comprises a first receiver for a radio based positioning system and a first control unit for generating first "device status datasets". These first device status datasets comprise at least positional data derived from the signal of the first receiver. The first device further comprises a radio circuit for broadcasting device status datasets to other devices. It also comprises an output device, wherein the first control unit is structured to generate proximity warnings to be issued by the output device. The proximity warnings are derived in dependence of the signal from the first receiver and of device status datasets received from other devices.

The second device comprises a second receiver for the radio based positioning system and a second control unit for generating second device status datasets. The second device status datasets again comprise at least positional data, this time derived from the signal of the second receiver. The second device further comprises a second radio circuit for broadcasting the second device status datasets to other monitoring devices.

In other words, the invention also relates to a method for generating proximity warnings on an area by means of a monitoring apparatus comprising a plurality of monitoring devices, wherein at least some of the monitoring devices are installed on at least a first and a second movable object operating in said area. At least part of said monitoring devices comprise a receiver for a radio based positioning system and a radio circuit. The method comprises the steps of receiving, on the second object, device status datasets from the first movable object, wherein said device status datasets of said first object are generated by a first and a second monitoring device mounted at a distance from each other on said first movable object, and generating, by the monitoring device of the second movable object, proximity warnings by taking an orientation and dimension of said first movable object into account.

This design and methods as described above allow the generation of device status datasets comprising positional data from two locations on the same object (the "first" object). This inherently allows to determine (by other, "second" objects) not only the position but also the orientation of the first object and/or to derive more accurate proximity warnings in relation to the first object.

In a first advantageous embodiment, the first device acts as a main device and is structured to receive the second device status dataset (i.e. at least the positional data of the second device, which acts as an auxiliary device), and to derive a reserved non-circular volume of space therefrom and from its own position. This non-circular volume of space is the volume attributed to (e.g. reserved for) the present object. The first device is further structured to encode this volume of space in its own device status dataset, i.e. in the "first" device status dataset, which is in turn broadcast to all other devices. Thus, the first device can gain full knowledge of the object's orientation in space, therefrom e.g. calculating the reserved, non-circular volume of space that other objects or vehicles should not enter.

In a second advantageous embodiment, the first and second devices are not in a main-auxiliary relationship. Rather, each device is structured to encode a first and a second circular volume of space in the first and second device dataset, respectively. The first volume of space is substantially centered around the position of the first device, while the second volume of space is substantially centered about the position of the second device. Together, the two volumes describe a reserved non-circular volume attributed to the object. A third monitoring device on an object other than the first object receives the device status datasets of the first and the second monitoring device and can derive collision warnings by combining information from the first and the second device status datasets.

The present invention does not require any cabling (except for power supply) between the two monitoring devices on an object, which makes installation easier and more cost effective, and renders the equipment more rugged.

The present invention also relates to a monitoring device with a control unit adapted to carry out the method of the invention.

BRIEF DESCRIPTION OF THE DRAWINGS

The invention will be better understood when consideration is given to the following detailed description thereof. Such description makes reference to the annexed drawings, wherein.

MODES FOR CARRYING OUT THE INVENTION

Definitions

A "movable object" is any object that can change and is expected to change its position and/or orientation or configuration in space. It may e.g. be a truck or any other vehicle that moves from place to place and changes its orientation in respect to the general north-south direction, e.g. by steering, or it may be an object positioned at a fixed location but able to rotate about its axis or to change its physical configuration, e.g. by extending an arm, in such a manner that the volume of safety space attributed to it varies in significant manner.

The term GNSS stands for "Global Navigation Satellite System" and encompasses all satellite based navigation systems, including GPS and Galileo.

The term "radio based positioning system" stands for a GNSS or for any other type of positioning system based on radio signals, such as a pseudolite system.

The term "monitoring apparatus" as used herein designates an assembly of devices distributed over several locations, which devices communicate with each other. Some of the devices are installed on movable objects while others may be installed at fixed locations.

The term circular volume of space specifies a volume that is circular at least in a horizontal cross section. It may be circular or non-circular in vertical cross section, or, if the proximity warning calculations are in two dimensions only, it may be undefined in vertical direction.

Figure 1:
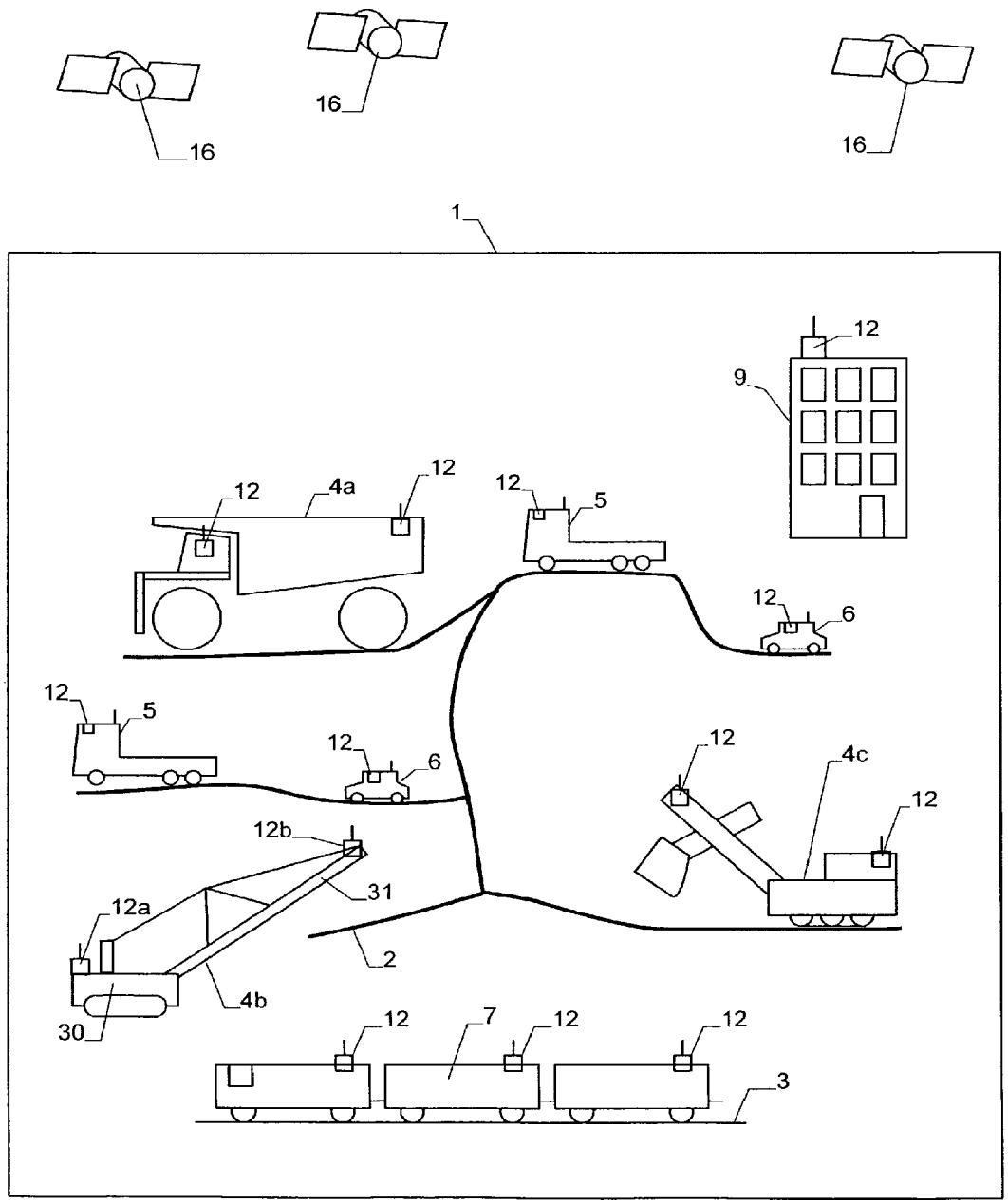
FIG. 1 shows a schematic representation of a site and a GNSS.

The Site:

FIG. 1 schematically depicts a site 1, such as a surface mine, to be monitored by the present system. The figure primarily shows the components relevant in the context of the present invention. Typically, such a site covers a large area, in the case of a surface mine e.g. in the range of square kilometers, with a network of roads 2 and other traffic ways, such as rails 3. A plurality of objects are present in the mine, such as:

Large vehicles, such as haul trucks 4a, cranes 4b or diggers 4c. Vehicles of this type may easily weigh several 100 tons, and they are generally difficult to control, have very large breaking distances, and a large number of blind spots that the driver is unable to visually monitor without monitoring cameras.

Medium sized vehicles 5, such as regular trucks. These vehicles are easier to control, but they still have several blind spots and require a skilled driver.

Small vehicles 6. Typically, vehicles of this type weigh 3 tons or less. They comprise passenger vehicles and small lorries.

Trains 7.

A further type of object within the mine is comprised of stationary obstacles, such as temporary or permanent buildings 9, open pits, boulders, non-movable excavators, stationary cranes, deposits, etc.

The risk of accidents in such an environment is high. In particular, the large sized vehicles can easily collide with other vehicles, or obstacles.

For this reason, the mine 1 is equipped with a monitoring apparatus that allows the generation of proximity warnings for the personnel of the site, thereby reducing the risk of collisions and accidents.

The Monitoring Apparatus:

Basically, the monitoring apparatus comprises a plurality of monitoring devices 12. These components communicate in wireless manner, in particular by radio signals. They are described in more detail in the following sections.

The Monitoring Devices:

The monitoring devices 12 for the proximity warning equipment of the objects and can e.g. be installed on the objects 4-7, 9.

The larger the number of installed monitoring devices 12, the higher the safety level.

Figure 2:
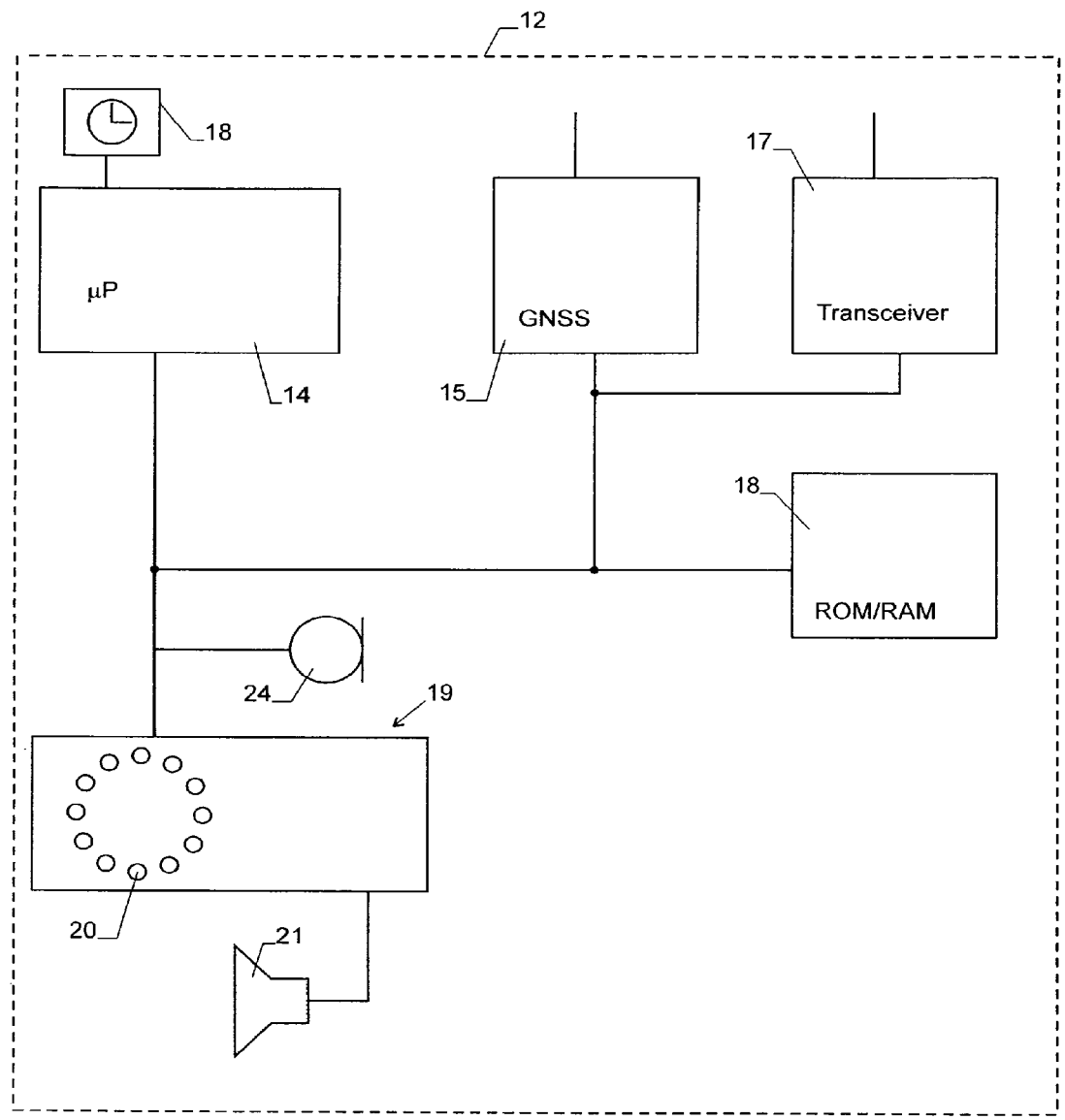
FIG. 2 is a block diagram of a monitoring device.

The monitoring device 12 as shown in FIG. 2 comprises a control unit 14, such as a microprocessor system, which controls the operations of the device.

The monitoring device 12 further comprises a GNSS receiver 15. Although it is called a GNSS receiver in the following, it can also be a receiver interoperating with any other radio based positioning system for determining its position. The present invention can be used on various types of radio based positioning systems.

The monitoring device 12 further comprises a radio transceiver or circuit 17 for exchanging data with other parts of the monitoring apparatus, e.g. with other monitoring devices 12.

Control unit 14 accesses a memory 18 that comprises programs as well as various parameters, such as a unique identifier of the monitoring device.

An output device 19 advantageously comprises an optical display 20 as well as an acoustic signal source 21, such as a loudspeaker.

The primary purpose of monitoring device 12 is to generate proximity warnings in case that there is a danger of collision. As mentioned in the introduction, this is achieved by receiving at least positional signals through GNSS receiver 15 and exchanging data derived therefrom with other monitoring devices in order to calculate relative positions and probabilities for collisions. The method for calculating relative positions is described in the next section, while further information about various aspects of the monitoring device follow later.

Relative Position Determination:

The operation of the monitoring devices can be basically as in conventional systems of this type, such as e.g. described in WO 2004/047047 and need not be described in detail herein.

In short, in a simple approach, each device obtains positional data derived from a signal from GNSS receiver 15. This positional data allows the determination of the position of the device and is stored in a "device status dataset". The device status dataset also contains a unique identifier (i.e. an identifier unique to each of the monitoring devices 12 used on the same site).

The device status dataset is emitted as a radio signal through transceiver 17. At the same time, the device receives the corresponding signals from neighboring devices and, for each such neighboring device, it calculates the relative distance d by subtracting its own coordinates from those of the neighboring device.

Proximity Warnings:

Proximity warnings can be generated by means of various algorithms. Examples of such algorithms are described in the following.

In a very simple approach, it can be tested if the absolute value of the relative distance d is below a given threshold. If yes, a proximity warning can be issued. This corresponds to the assumption that a circular volume in space is reserved for each object. The radius of the circular volume attributed to an object can e.g. be encoded in its device status dataset.

A more accurate algorithm can e.g. take into account not only the relative position, but also the driving velocities and directions of the vehicles.

An improvement of the prediction of collisions can be achieved by storing data indicative of the size and/or shape of the vehicle that a monitoring device is mounted to. This is especially true for large vehicles, which may have non-negligible dimensions. In a most simple embodiment, a vehicle can be modeled to have the same size in all directions, thereby defining a circle/sphere "covered" by the vehicle. If these circles of spheres of two vehicles are predicted to intersect in the near future, a proximity warning can be issued.

Instead of modeling an object or vehicle by a simple circle or sphere, a more refined modeling and therefore proximity prediction can be achieved by storing the shape (i.e. the bounds) of the vehicle in the dataset or by determining the same dynamically as in the embodiments described below. In addition, not only the shape of the vehicle, but also the position of the GNSS-receiver 15 (or its antenna) in respect to this shape or bounds can be stored in memory 18.

An important refinement of this scheme is described in the next section.

Orientation Determination

Any object that is to be modeled as being non-rotationally symmetric, such as elongate objects, requires knowledge of its orientation in space in order to allow for the generation of an accurate model. For example, a crane or digger having elongate shape, or a long truck, needs to know its alignment in respect to the north-south direction.

In the context of the present invention, this is achieved by mounting more than one device 12 on at least one of the objects. In FIG. 1, this has e.g. been indicated for haul truck 4a, crane or dragline 4b and digger or shovel 4c, as well as for train 7.

In the following, the operation of this scheme is described, as an example, for crane 4b of FIG. 1.

As shown, crane 4b has two devices 12a, 12b mounted to it at a distance from each other. One of them, namely device 12a, is located e.g. at the base vehicle 30 of the crane, while the other, namely device 12b is advantageously mounted to the remote end of the boom 31. Basically, each of the devices 12a, 12b are of the same design, e.g. the design as illustrated in FIG. 2, and is able to determine its position based on the received GNSS signals and to broadcast the same through transceiver 17.

They communicate by the radio signals as transmitted by transceiver 17. There are two advantageous embodiments of operation as explained in the following two sections.

First Embodiment

In a first embodiment, one of the devices operates as a "main unit", while the other operates as an auxiliary unit. The auxiliary device is advantageously mounted to the end of boom 31 and is, in the following, called the auxiliary device 12b. The other device is the main device 12a and is located close to the driver's seat.

Both devices 12a, 12b repetitively and independently determine their position from their received GNSS signal.

Auxiliary device 12b emits its position encoded in its device status dataset through its transceiver 17.

Main device 12a receives the device status dataset of slave device 12a by means of its own transceiver 17. For this purpose, main device 12a knows the unique identifier of auxiliary device 12b, or another type of identifier has been provided to allow main device 12a to recognize the device status dataset of its attributed auxiliary device 12b.

Main device 12a then determines the relative distance d to auxiliary device 12b. The direction of this vector is then used by main device 12a to determine the orientation of the object, such as crane 4b. This, in turn allows the definition of a presently used or reserved non-circular volume of space attributed to the object. Main device 12a encodes this volume of space it its device status dataset and broadcasts the same through transceiver 17.

A third monitoring device 12 located on another object, which receives the device status dataset from main device 12a, can then generate a proximity warning based on the non-circular volume of space attributed to the object of main device 12a.

In the context of the first embodiment, only main device 12a has to process the signal from auxiliary device 12b. Hence, in order to suppress unnecessary processing by other devices, the device status dataset of auxiliary device 12b can contain data indicating that the second device is an auxiliary device and its dataset can therefore be ignored by all devices except its attributed main device.

Second Embodiment

In a second embodiment, which is simpler to set up, both devices 12a, 12b operate identically and not in a main-auxiliary relationship. In this case, each device 12a, 12b sends out its position and e.g. data indicative of a circular volume of space attributed to the device. Advantageously, the radius of the volumes is such that the two spheres overlap, in such a manner that the whole object lies within one or the other sphere.

Hence, the two devices describe a pair of spheres attributed to the object and encode the same in their device status dataset. When the object (vehicle) changes its orientation in space, the relative position of the spheres changes as well, thereby accounting for the new orientation of the object.

Advantageously, at least the first device 12a (i.e. the device that is monitored by the operator (driver) of the object (vehicle)) is aware that the second device 12b is attributed to the same object and therefore suppresses any proximity warnings that would arise from the proximity of the first and second devices.

Issuing Proximity Warnings:

Proximity warnings can, as mentioned, e.g. be issued by an optical display 20 that can be observed by the user and/or an acoustic signal.

In addition, the acoustic signal source 21 can generate voice data and/or other types of sound.

Notes:

In both of the above embodiments, only the monitoring device 12 closest to the driver needs to be able to generate proximity warnings, while the other device does not necessarily have to be able to do so. Hence, the second device does not necessarily need to comprise an output device 19 and radio circuit 17, but can be a simple emitter without receiver capabilities. For cost reasons and logistical reasons, though, it may often be advantageous if the hardware of the various devices is the same.

In addition, in the second embodiment, any proximity warning issued by the second device is lost, unless it is specifically transmitted to the first device in order to be brought to the driver's attention.

In the above embodiments, two monitoring devices have been mounted to a single object. It can be advantageous to mount more than two monitoring devices to a single object:

In the first embodiment, this may e.g. be the case if the object has several moving parts, such as a crane with an articulated boom or two separate booms. In this case, one monitoring device is the first device, i.e. the main device, while the other monitoring devices are the second devices, i.e. the auxiliary devices.

In the second embodiment, using several monitoring devices on a single object is also advantageous for very long objects, where the volume of space attributed to the objects can be more accurately defined by three or more circular volumes than by only two circular volumes.

In FIG. 1, the train 1 is indicated as such an object comprising more than two monitoring devices 12.

The present invention can not only be used on the site of a mine, but also on any other site or area where large movable objects are operating.

The invention can also be used to accurately display the direction to another movable object. For this purpose, the first monitoring device 12a is adapted to execute the following steps:

receiving the second device status dataset from the second monitoring device 12b, deriving, from the position of the first device 12a and from the second device status dataset, an orientation of the first movable object, receiving a third device status dataset from a third monitoring device mounted to a second movable object, determining a direction to the second movable object in respect to said orientation, and displaying data indicative of said direction on the display 20.

In this context, the "orientation" of the first movable object can e.g. be expressed as the direction that the driver's seat is presently facing, such as "22° clockwise from north". If, for example, the direction from the first to the second movable object points along 112° clockwise from north, the LED at three o'clock could in that case be lighted, indicating that the second object is perpendicularly right to the direction that the driver is facing.

If the orientation of the first object were not known, the direction to the second vehicle could not be shown to the operator, as only relative coordinates between the first and second vehicles are known, but not the direction that the operator is facing.

While there are shown and described presently preferred embodiments of the invention, it is to be distinctly understood that the invention is not limited thereto but may be otherwise variously embodied and practiced within the scope of the following claims.

What is claimed is:

1. A system for a movable object with a first monitoring device, said first monitoring device comprising:
   a first receiver for a radio based positioning system;
   a first control unit for generating first device status datasets, wherein said first device status datasets comprise positional data derived from a signal of said first receiver;
   a first radio circuit for broadcasting said first device status datasets to other monitoring devices; and
   an output device adapted to issue proximity warnings,
   wherein said first control unit is structured for generating said proximity warnings in dependence of the signal from said first receiver and of device status datasets received from other devices;
   wherein said movable object comprises at least one second monitoring device, wherein said at least one second monitoring device comprises:
      a second receiver for the radio based positioning system,
      a second control unit for generating second device status datasets, wherein said second device status datasets comprise positional data derived from a signal of said second receiver, and
      a second radio circuit for broadcasting said second device status datasets to other monitoring devices; and
   wherein said first monitoring device and said at least one second monitoring device are arranged on said same movable object at a distance from each other for determining an orientation of said same movable object.

2. The system of claim 1, wherein said first monitoring device is structured to receive said second device status datasets and derive a reserved non-circular volume of space attributed to said same movable object and to encode said reserved non-circular volume of space in said first device status datasets.

3. The system of claim 1, wherein said first monitoring device and said second monitoring device are each structured to encode a first and a second circular volume of space in said first and second device status datasets, respectively.

4. The system of claim 3, wherein said first and said second circular volumes overlap.

5. The system of claim 1, further comprising at least one other monitoring device.

6. A particular movable object comprising the system as defined in claim 1, wherein said first monitoring device and said at least one second monitoring device are mounted to said particular movable object at a distance from each other for determining an orientation of said particular movable object.

7. The particular movable object of claim 6, wherein said particular movable object is one from the group consisting of vehicles, cranes, draglines, haul trucks, diggers, and shovels.

8. The system of claim 1, wherein said first monitoring device is adapted to generate said proximity warnings based on a risk of collision.

9. The system of claim 1, further comprising cabling between said first monitoring device and said at least one second monitoring device, wherein the cabling is used only to supply power.

10. The system of claim 1, wherein said first radio circuit of said first monitoring device is adapted for exchanging data with said at least one second monitoring device.

11. A method for generating proximity warnings on an area by means of a monitoring apparatus comprising a plurality of monitoring devices, wherein at least some of said monitoring devices are installed on objects operating in said area, wherein at least part of said monitoring devices comprise a receiver for a radio based positioning system and a radio circuit, said method comprising:
   mounting, to a same at least one first movable object in said area, a first and a second monitoring device at a distance from each other for determining an orientation of said same at least one first movable object;
   generating, by means of said first monitoring device, a first device status dataset depending on a position of said first monitoring device, and emitting said first device status dataset through the radio circuit of said first monitoring device; and
   generating, by means of said second monitoring device, a second device status dataset derived from a position of said second monitoring device, and emitting said second device status dataset through the radio circuit of said second monitoring device.

12. The method of claim 11, further comprising:
receiving, by said first monitoring device, said second device status dataset;
deriving, in said first monitoring device, from a position of said first monitoring device and from said second device status dataset, a reserved, non-circular volume of space attributed to said same at least one first movable object and encoding said reserved, non-circular volume of space in said first device status dataset; and
broadcasting said first device status dataset to other monitoring devices.

13. The method of claim 12, further comprising:
encoding, in the second device status dataset of said second monitoring device, data indicating that the second monitoring device is an auxiliary device and its device status dataset can therefore be ignored by any other devices with the exception of a main device attributed to said second monitoring device.

14. The method of claim 12, further comprising:
encoding, by said first and second monitoring devices, first and second reserved volumes of space in said first and second device status datasets, respectively;
receiving, by a third monitoring device on an object other than said same at least one first movable object, said first and second device status datasets; and
determining, by the third monitoring device, collision warnings by combining information from the first and the second device status datasets.

15. The method of claim 14, wherein said first and said second reserved volumes of space are circular and overlap.

16. The method of claim 14, wherein said first monitoring device suppresses any proximity warnings that would arise from a proximity of the first and the second monitoring devices.

17. The method of claim 11, further comprising:
receiving, by said first monitoring device, the second device status dataset;
deriving, from said position of the first monitoring device and from the second device status dataset, said orientation of said same at least one first movable object;
receiving, by said first monitoring device, a third device status dataset from a third monitoring device mounted to a second movable object;
determining a direction to the second movable object in respect to said orientation; and
displaying data indicative of said direction on a display of said first monitoring device.

18. A monitoring device comprising a control unit adapted and structured to carry out the method of claim 11.

19. A method for generating proximity warnings in an area by means of a monitoring apparatus comprising a plurality of monitoring devices, wherein at least some of said monitoring devices are installed on at least a first and a second movable object operating in said area, wherein at least part of said monitoring devices comprise a receiver for a radio based positioning system and a radio circuit, said method comprising:
receiving, on said second movable object, device status datasets from said first movable object, wherein said device status datasets of said first movable object are generated by a first and a second monitoring device mounted at a distance from each other on said same first movable object for determining an orientation of said same first movable object; and
generating, by the monitoring device of the second movable object, proximity warnings by taking an orientation and dimension of said same first movable object into account.

20. The method of claim 19,
wherein the device status dataset of the first monitoring device on said same first movable object contains information of the device status dataset from the second monitoring device on said same first movable object; and
wherein the monitoring device of the second movable object derives orientation information of said same first movable object from said device status dataset of the first monitoring device mounted on said same first movable object.

* * * * *